US010252655B2

(12) United States Patent
Rossi et al.

(10) Patent No.: US 10,252,655 B2
(45) Date of Patent: Apr. 9, 2019

(54) PADDED ELEMENT, AND PROCESS AND MOLD FOR PRODUCING SAME

(71) Applicant: PROPRIETECT L.P., Toronto (CA)

(72) Inventors: Pasquale Rossi, Sarnia (CA); Edgardo A San Miguel, Guelph (CA)

(73) Assignee: PROPRIETECT L.P., Toronto (CA)

( * ) Notice: Subject to any disclaimer, the term of this patent is extended or adjusted under 35 U.S.C. 154(b) by 0 days.

(21) Appl. No.: 14/892,670

(22) PCT Filed: May 21, 2014

(86) PCT No.: PCT/CA2014/000436
§ 371 (c)(1),
(2) Date: Nov. 20, 2015

(87) PCT Pub. No.: WO2014/186866
PCT Pub. Date: Nov. 27, 2014

(65) Prior Publication Data
US 2016/0114712 A1 Apr. 28, 2016

Related U.S. Application Data

(60) Provisional application No. 61/855,768, filed on May 23, 2013.

(51) Int. Cl.
*B60N 2/70* (2006.01)
*A47C 27/15* (2006.01)
(Continued)

(52) U.S. Cl.
CPC .............. *B60N 2/7017* (2013.01); *A47C 7/18* (2013.01); *A47C 7/20* (2013.01); *A47C 7/72* (2013.01);
(Continued)

(58) Field of Classification Search
CPC ................ B60N 2/7035; B60N 2/7017; B61D 33/0035; A47C 7/18; A47C 7/20; A47C 7/72
(Continued)

(56) References Cited

U.S. PATENT DOCUMENTS 2,831,532 A * 4/1958 Kasper ................... A47C 27/15
297/229
3,000,020 A * 9/1961 Lombard ................. A47C 7/20
244/122 R
(Continued)

FOREIGN PATENT DOCUMENTS

DE 2945882 5/1981
JP S565743 2/1981
(Continued)

OTHER PUBLICATIONS

International Search Report for PCT/CA2014/000436 dated Aug. 29, 2014.
(Continued)

*Primary Examiner* — Jose V Chen
(74) *Attorney, Agent, or Firm* — Michael S. Tomsa; McAndrews, Held & Malloy, Ltd.

(57) ABSTRACT

There is disclosed a padded element. In one embodiment, the padded element comprises a molded foam topper portion and a molded foam substrate portion secured with respect to the molded foam topper portion. The molded foam topper portion and the molded foam substrate portion have a different indentation force deflection at 25% thickness when measured pursuant to ASTM 3574-$B_1$. In another embodiment, the padded element comprises a molded foam topper portion and a molded foam substrate portion secured with respect to the molded foam topper portion via an interference fit.

20 Claims, 7 Drawing Sheets

(51) Int. Cl.
| | | |
|---|---|---|
| *A47C 7/18* | (2006.01) | |
| *A47C 7/72* | (2006.01) | |
| *B68G 5/02* | (2006.01) | |
| *B29C 44/04* | (2006.01) | |
| *B29C 44/56* | (2006.01) | |
| *B60N 2/58* | (2006.01) | |
| *A47C 7/20* | (2006.01) | |
| *B29L 31/58* | (2006.01) | |
| *B29K 23/00* | (2006.01) | |
| *B29K 75/00* | (2006.01) | |

(52) U.S. Cl.
CPC ............. *A47C 27/15* (2013.01); *B29C 44/04* (2013.01); *B29C 44/5627* (2013.01); *B60N 2/5825* (2013.01); *B60N 2/70* (2013.01); *B68G 5/02* (2013.01); *B29K 2023/06* (2013.01); *B29K 2023/12* (2013.01); *B29K 2075/00* (2013.01); *B29K 2995/0097* (2013.01); *B29L 2031/58* (2013.01)

(58) Field of Classification Search
USPC ........................................ 297/452.48, DIG. 1
See application file for complete search history.

(56) References Cited

U.S. PATENT DOCUMENTS

| | | | | |
|---|---|---|---|---|
| 3,118,153 | A * | 1/1964 | Hood ..................... | A47C 27/15 297/DIG. 1 |
| 3,222,697 | A * | 12/1965 | Scheermesser ...... | A47C 27/144 297/452.48 |
| 3,513,491 | A * | 5/1970 | Gordon ................. | A47C 27/00 182/137 |
| 4,837,881 | A * | 6/1989 | Kondo ................... | A47C 7/18 297/452.27 |
| 5,142,757 | A | 9/1992 | Thary | |
| 5,163,194 | A * | 11/1992 | Dixon ................. | A47G 9/1081 5/636 |
| 5,639,145 | A * | 6/1997 | Alderman ............. | A47C 7/021 297/188.04 |
| 6,739,008 | B1 * | 5/2004 | Kindrick ................ | A47C 7/021 5/655.9 |
| 7,426,767 | B2 * | 9/2008 | Mossbeck ............ | A47C 27/144 5/652.1 |
| 7,501,175 | B2 | 3/2009 | Branch et al. | |
| 7,934,774 | B2 * | 5/2011 | Galbreath ............... | B60N 2/70 297/452.26 |
| 7,946,655 | B2 * | 5/2011 | Hsu ....................... | A47C 7/022 297/452.46 |
| 8,025,964 | B2 * | 9/2011 | Landvik ................ | A47C 27/15 428/213 |
| 8,141,957 | B2 * | 3/2012 | McClung .............. | A47C 7/282 297/452.27 |
| 8,656,537 | B2 * | 2/2014 | Leifermann ......... | A47G 9/0253 5/636 |
| 2008/0157583 | A1 * | 7/2008 | Boren ................... | B64D 11/06 297/452.48 |
| 2009/0058167 | A1 * | 3/2009 | San Miguel ............ | A47C 7/18 297/452.48 |
| 2009/0085384 | A1 | 4/2009 | Galbreath et al. | |
| 2011/0187176 | A1 * | 8/2011 | Besnard ................. | B29C 44/04 297/452.48 |
| 2011/0278902 | A1 * | 11/2011 | Galbreath ............... | B60N 2/70 297/452.48 |
| 2012/0313421 | A1 * | 12/2012 | Kondo ................... | A47C 27/15 297/452.48 |
| 2014/0132054 | A1 * | 5/2014 | Steinmeier ............. | B60N 2/64 297/452.48 |
| 2015/0028650 | A1 * | 1/2015 | Rossi ................... | A47C 27/144 297/452.48 |

FOREIGN PATENT DOCUMENTS

| | | | |
|---|---|---|---|
| JP | 2005-059358 | * | 3/2005 |
| WO | WO2005/002915 | | 1/2005 |
| WO | WO2010/014110 | | 2/2010 |
| WO | WO2013006959 | | 1/2013 |

OTHER PUBLICATIONS

Extended European search report for Application No. 14800298.3, dated Dec. 16, 2016.

* cited by examiner

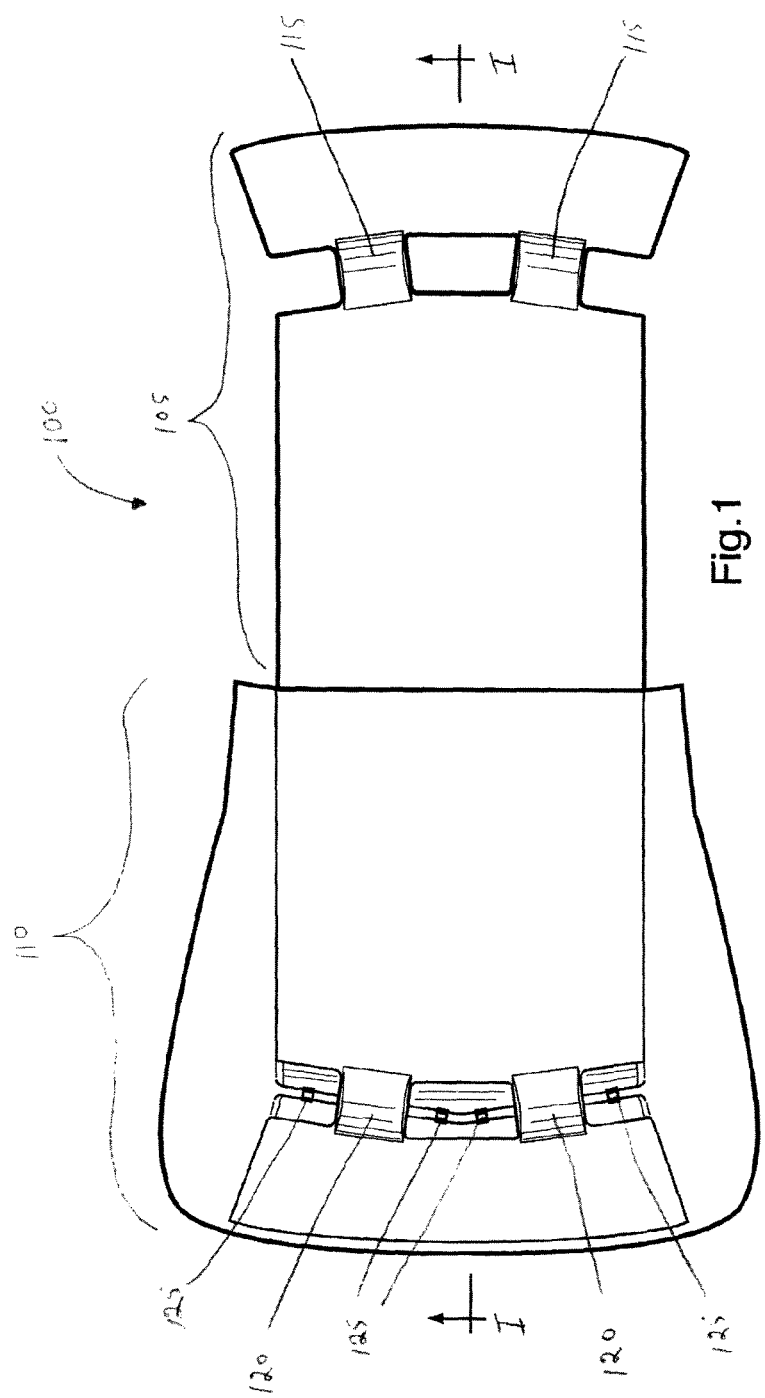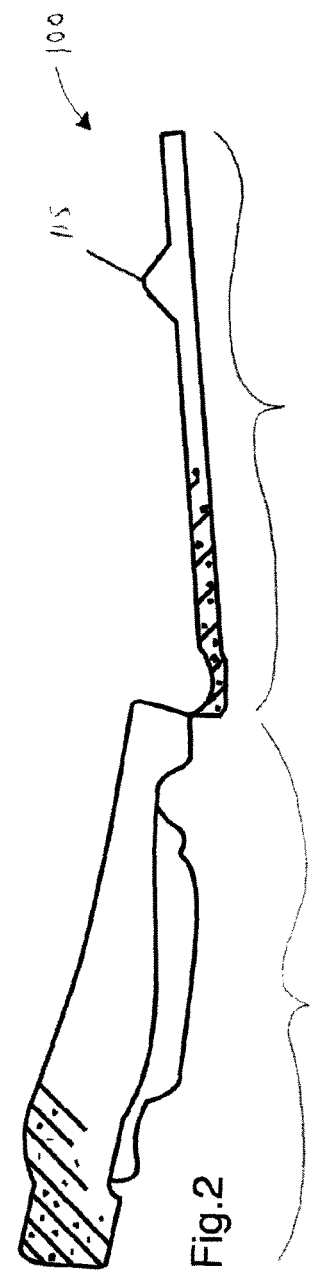

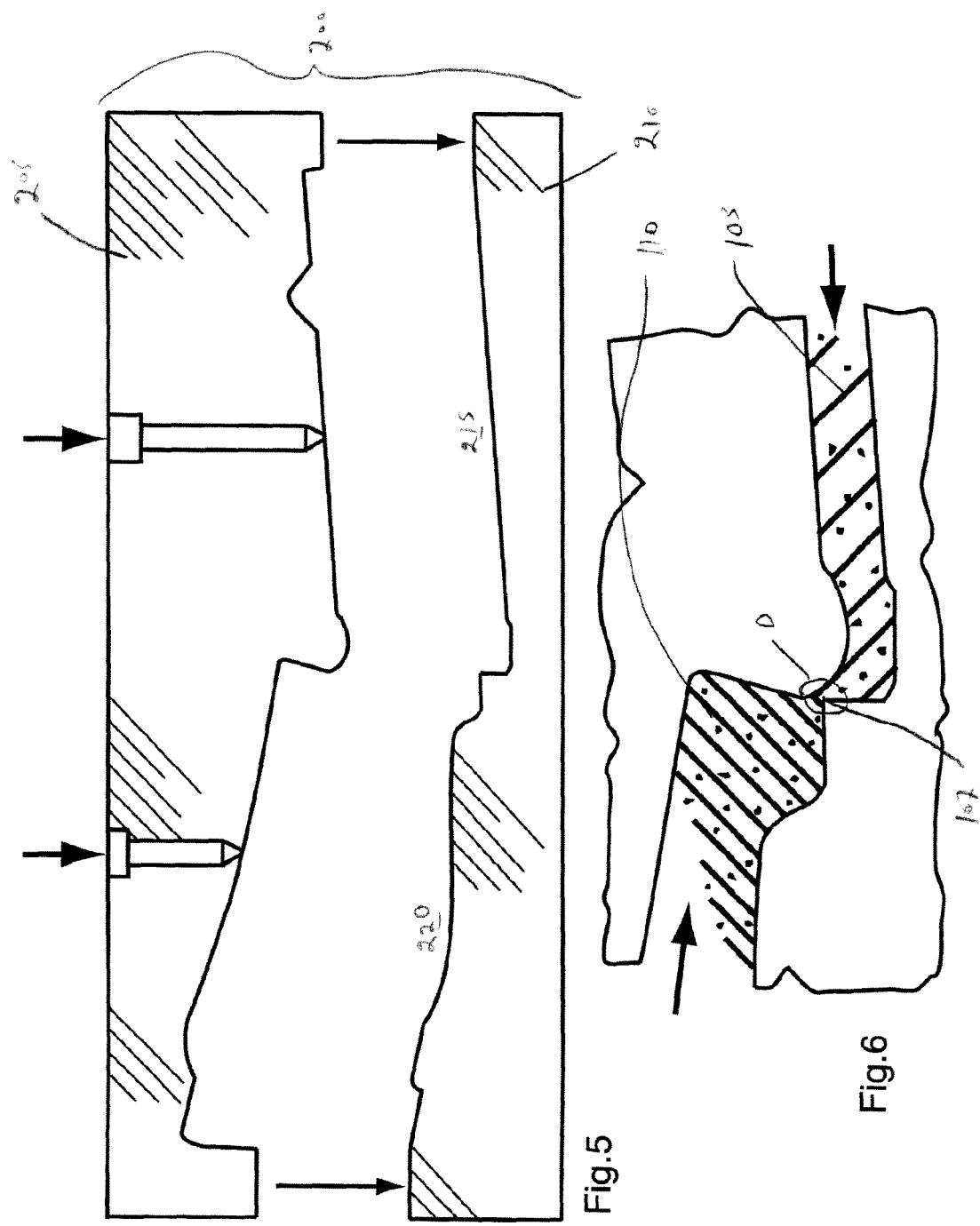

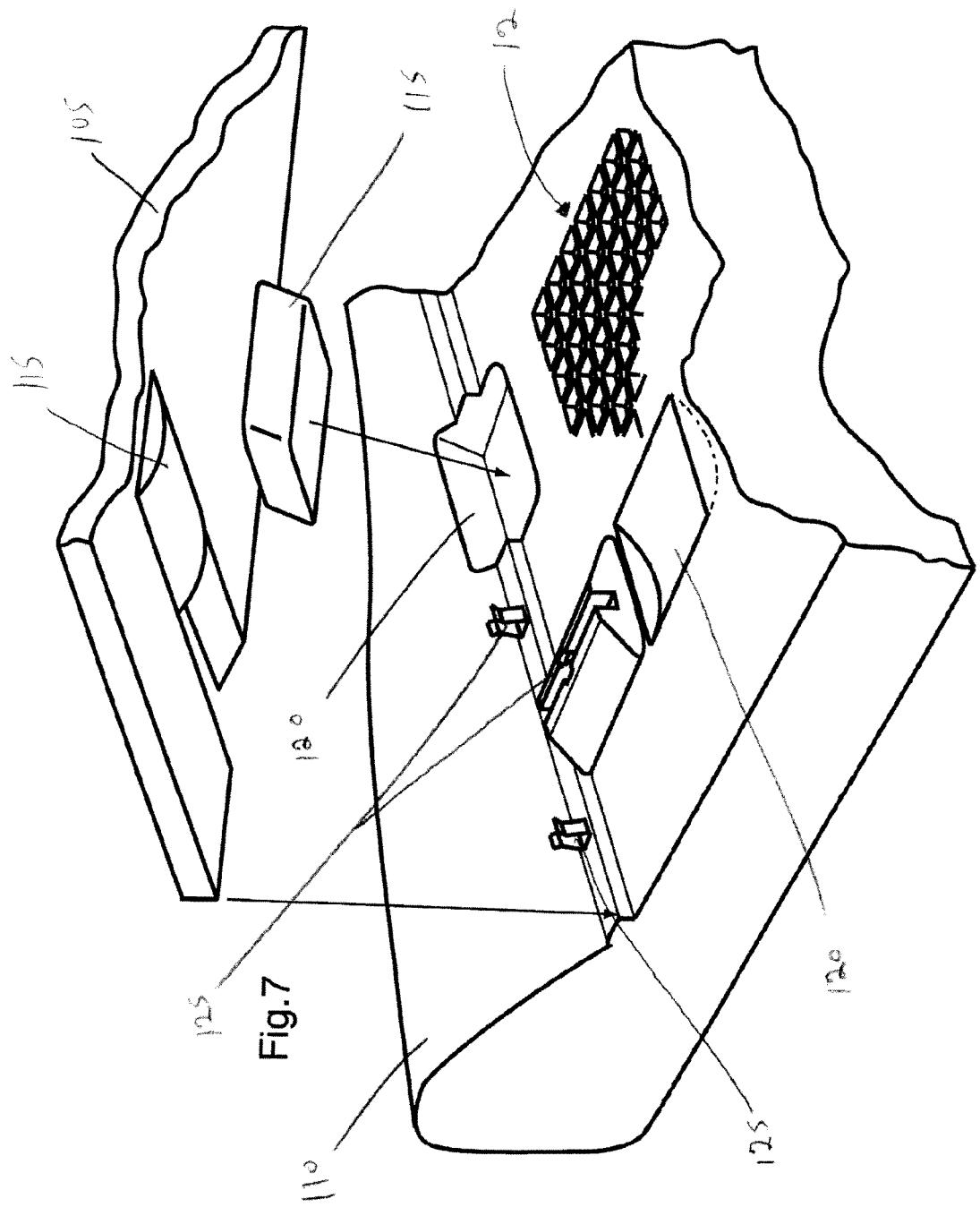

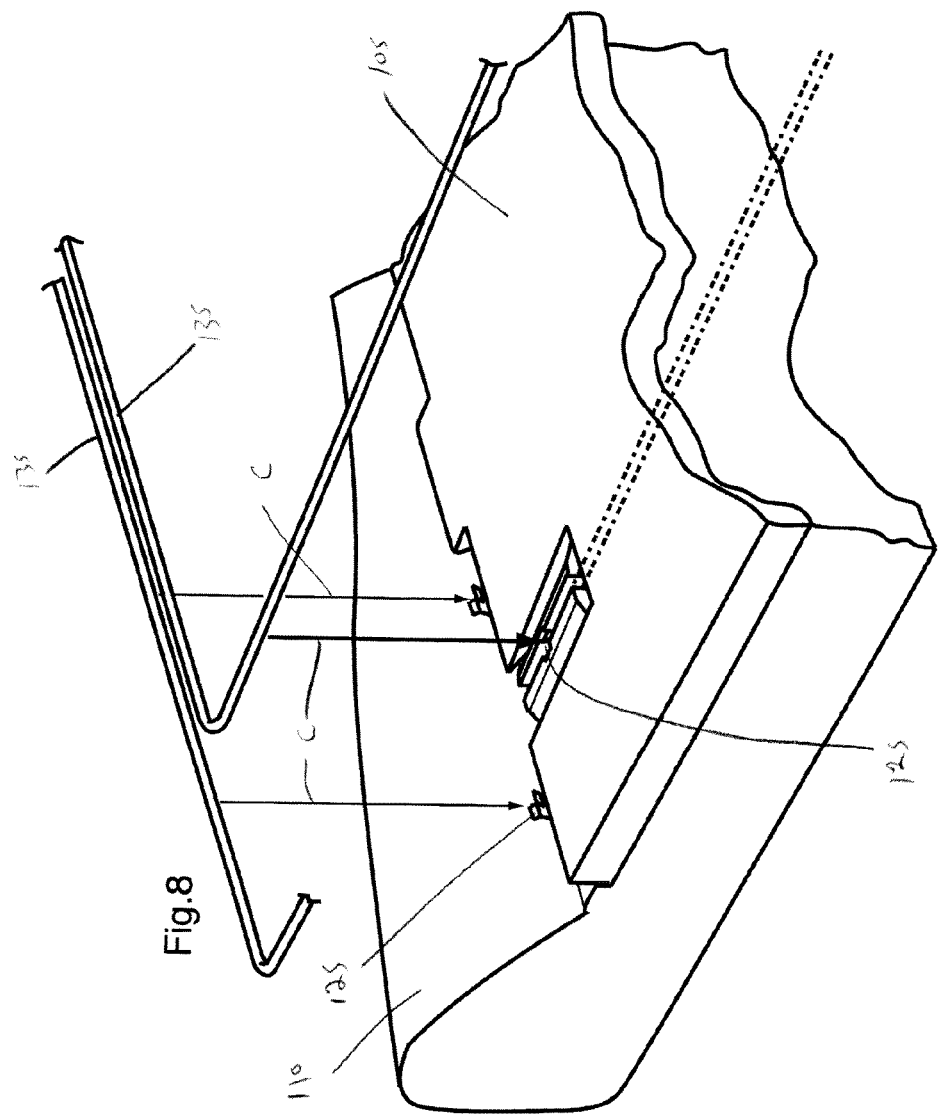

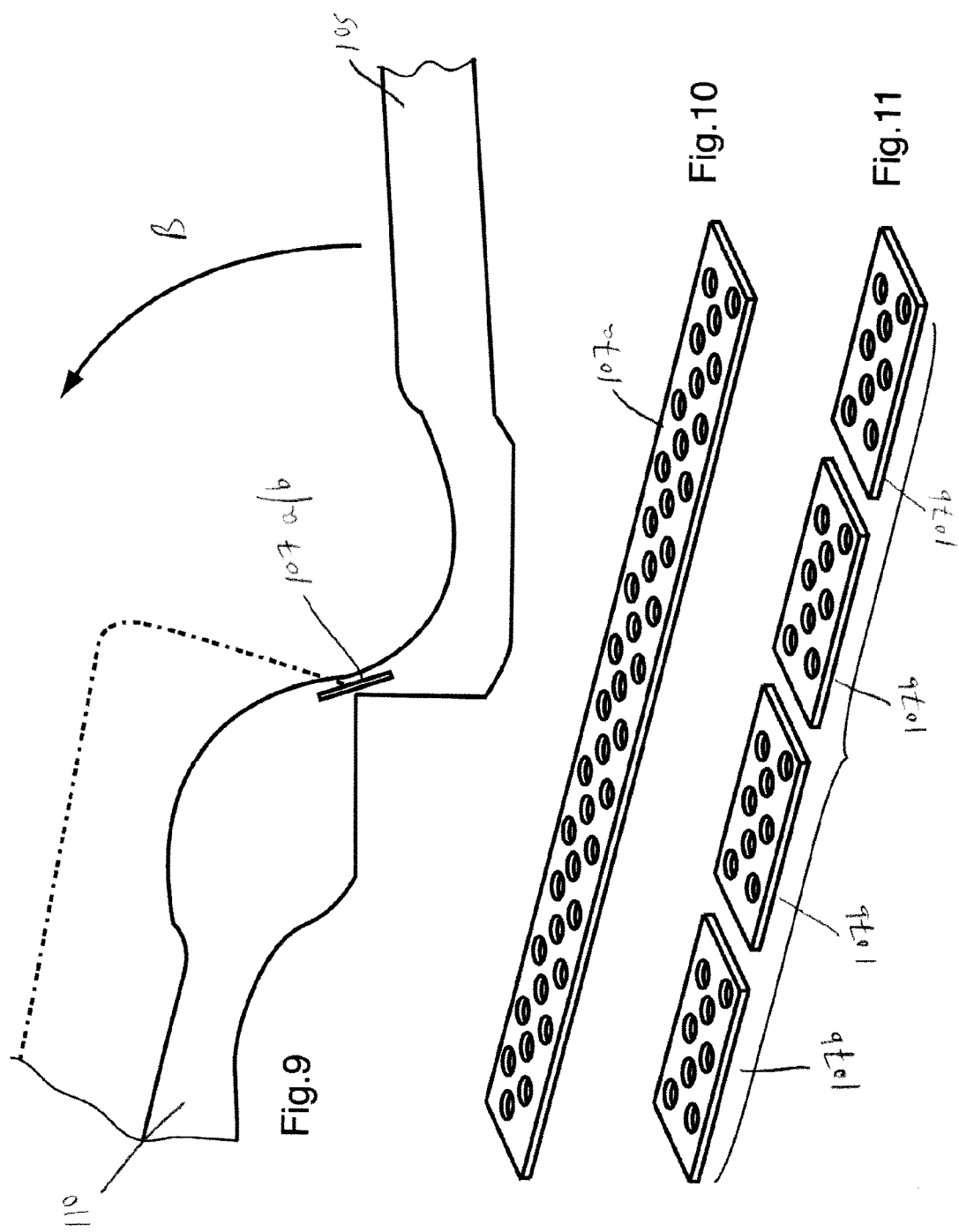

US 10,252,655 B2

PADDED ELEMENT, AND PROCESS AND MOLD FOR PRODUCING SAME

CROSS-REFERENCE TO RELATED APPLICATION

The present application is a National Phase Entry of PCT International Application No. PCT/CA2014/000436, which was filed on May 21, 2014, and claims the benefit under 35 U.S.C. § 119(e) of provisional patent application S.N. 61/855,768, filed May 23, 2013, the contents of which are hereby incorporated by reference.

BACKGROUND OF THE INVENTION

Field of the Invention

In one of its aspects, the present invention relates to a padded element, preferably a seat element, more preferably a vehicular seat element. In another of its aspects, the present invention relates to a process for producing a foam seat element, preferably a vehicular seat element. In yet another of its aspects, the present invention relates to a mold for producing a molded element, preferably a molded foam seat element, more preferably a molded foam vehicular seat element.

Description of the Prior Art

Passenger seats in vehicles, such as automobiles, are typically fabricated from a foam (usually a polyurethane foam) material which is molded into the desired shape and covered with an appropriate trim cover. The foamed material is selected to provide passenger comfort by providing a resilient seat and the trim cover is selected to provide the desired aesthetic properties.

In recent years, seats such as vehicular seats have been developed to confer one or more of the following to the seat: comfort, climate control, occupant detection and the like.

One area that has received particular attention is the provision of dual density or dual firmness seat components that are more dense or firmer in the peripheral portions of the seat thereby conferring to the occupant a snug or "wrapped-in" feel. This is especially important in performance vehicles which are designed such that turning at relatively high speed may be accomplished. However, there is an ongoing challenge to balance support provided by the seat with comfort of the occupant.

Dual density or dual firmness seat elements are expensive to produce and, in many cases, alter the feel of the supporting surface of the seat only in areas where it is perceived to be important to have different firmness properties. In other words, the conventional dual density or dual firmness seat elements use a generally coarse approach to provision of variable density or firmness.

Further, dual (or multi) density or dual (or multi) firmness seats typically require the use of two or more types of foam (e.g., molded, free rise, bead and the like) which are typically produced separately and secured together increasing the production time and costs of the final seat product. Alternatively, certain dual (or multi) firmness seats are made by molding or otherwise securing an insert (e.g., wire components, flexolators and the like) to a foam substrate.

International Publication No. WO 2006/102751 [San Miguel et al. (San Miguel)] teaches a foam seat element, a mold for production thereof and a method to manufacture the mold. The foam seat element taught by San Miguel comprises a seating surface in which one or more textured surfaces, the same or different, are created. The provision of such textured surfaces makes it possible to achieve in a single density part the "dual firmness" (or multi-firmness) comfort or feel that is conveniently achieved using multi-density foam pieces in a seat element. One of the advantages of the approach in San Miguel is it is possible to confer to the seat element a soft feel touch as an alternative to conventional so-called plus padding.

While the teachings in San Miguel represent an advance in the art, there is still room for improvement.

Specifically, when applying the teachings of San Miguel to vehicular car seats, it is conventional to create the one or more textured surfaces in the so-called A-surface of the vehicular seat. In doing this, there is a likelihood that the textured surface can be felt or seen through the trim cover (leather or upholstery) used to cover the foam seat element—this is also known in the art as "read through". Automotive companies have continually increased the specifications and requirements for fit and finish of vehicular seats and the occurrence of "read through" in a vehicular seat is considered a disadvantage.

Accordingly, it would be desirable to have a foam element which, on the one hand, maintains the technical advantage of San Miguel (i.e., the ability to have different zones of comfort or feel in a surface of a foam element while a using a single density foam) while, on the other hand, obviating or mitigating the occurrence of "read through" in the A-surface of the foam element when it is adapted for vehicular seats.

In addition, it would be desirable to have a padded element that utilized molded foams having a different hardness from the A-surface to the B-surface of the padded element. It would be particularly advantageous if such a padded element could be produced from a unitary molded foam thereby simplifying production and lower chemical and/or labour costs to produce the padded element.

In addition, it would be desirable to have a padded element comprising a topper portion and substrate portion that could be reliably secured to one another (e.g., during application of a trim cover) without the need for extra mechanical parts and/or chemical adhesives.

SUMMARY OF THE INVENTION

It is an object of the present invention to obviate or mitigate at least one of the above-mentioned disadvantages of the prior art.

Accordingly, in one of its aspects, the present invention provides a padded element comprising a molded foam topper portion and a molded foam substrate portion secured with respect to the molded foam topper portion, the molded foam topper portion and the molded foam substrate portion having a different indentation force deflection at 25% thickness when measured pursuant to ASTM 3574-$B_1$.

Preferably, the molded foam substrate portion has a greater indentation force deflection than the molded foam topper portion. More preferably, the molded foam substrate portion has an indentation force deflection that is at least about 5% greater than the molded foam topper portion. Even more preferably, the molded foam substrate portion has an indentation force deflection that is at least about 10% greater than the molded foam topper portion. Even more preferably, the molded foam substrate portion has an indentation force deflection that is at least about 15% greater than the molded foam topper portion. Ideally, the relative indentation force deflections of the molded foam topper portion and the molded foam substrate portion are selection so as to achieve on overall indentation force deflection of the padded element that substantially achieves a desired (or prescribed) hysteresis response when an occupant contacts the padded element.

In another of its aspects, the present invention provides a padded element comprising a molded foam topper portion and a molded foam substrate portion secured with respect to the molded foam topper portion via an interference fit.

In both of the general embodiments of the padded element referred to above, it is preferred that the molded foam topper portion have a cross-sectional thickness in the range of from about 5 mm to about 30 mm, more preferably from about 5 mm to about 20 mm, most preferably from about 8 mm to about 15 mm.

In both of the general embodiments of the padded element referred to above, it is preferred that the molded foam substrate portion have a cross-sectional thickness in the range of from about 15 mm to about 120 mm, more preferably from about 20 mm to about 80 mm, most preferably from about 35 mm to about 60 mm.

In another of its aspect, the present invention provides a mold for production of a molded element, the mold comprising a first mold portion and a second mold portion engageable to define a mold cavity, the mold cavity comprising a first sub-cavity, a second sub-cavity and intermediate portion therebetween, the intermediate portion configured to allow a first molding material from the first sub-cavity to contact (preferably co-mingle) with a second molding material from the second sub-cavity to produce a connecting portion interconnect first molded material produced in the first sub-cavity and second mold material produced in the second sub-cavity.

In a preferred embodiment, the padded element is comprised in a seat element. In this preferred embodiment, the seat element preferably comprises a molded foam seat element, more preferably a molded foam element comprising a unitary foam portion. An advantage of using such a molded foam element in the present seat element is the presence of a skin on the surface of one or both of the first internal surface and the second internal surface. The presence of the skin is characterized by the internal surface (first and/or second) having a greater density at the surface (e.g., 1 mm depth) as compared to to the central or core region remote from the internal surface. Density can be determined using ASTM D-3574. While not wishing to be bound by any particular theory or mode of action, it is believed that the presence of such a skin (e.g., as distinct from the case where the peaks are simply glued to and/or the valleys are simply cut out of the seating surface element) confers a desirable combination of support and comfort to an occupant of the seat element.

In one embodiment, the present padded element is advantageous in that it utilizes molded foams having different hardness from the A-surface to the B-surface of the padded element. In this embodiment, it is preferred to produce the padded element from a unitary molded foam thereby simplifying production and lower chemical and/or labour costs to produce the padded element.

In one embodiment, the present padded element is advantageous in that comprises a topper portion and substrate portion that are reliably secured to one another by an interference fit (e.g., during application of a trim cover) without the need for extra mechanical parts and/or chemical adhesives.

The term "interference fit" is intended to connote that the topper portion and the substrate portion are secured to one another via a friction fit or interaction. Preferably, this is achieved using a male-female coupling although it should be clear that other coupling arrangements may be used. Also, it should be clear that, when a male-female coupling is used, it is not necessary for the male half and the female have a complementary size and/or shape (although this is preferred).

Of course, those of skill in the art will recognize other advantages accruing from the present seat element based on the present specification.

BRIEF DESCRIPTION OF THE DRAWINGS

Embodiments of the present invention will be described with reference to the accompanying drawings, wherein like reference numerals denote like parts, and in which:

FIG. 1 illustrates a perspective view of a first embodiment of the pated element of the present invention;

FIG. 2 illustrates a sectional view along line I-I in FIG. 1;

FIG. 5 illustrates a schematic of a mold for producing the pated element in FIGS. 1 and 2;

FIG. 6 illustrates an enlarged portion of the mold illustrated in FIG. 5 after it has been filled with a foamable composition an closed;

FIGS. 7 and 8 illustrate enlarged perspective views of the interference fit between the major components of the pated element illustrated in FIGS. 1 and 2; and FIGS. 9 and 11 illustrate alternate embodiments for connection of the major components of the pated element illustrated in FIGS. 1 and 2.

DETAILED DESCRIPTION OF THE PREFERRED EMBODIMENTS

Figure 3:
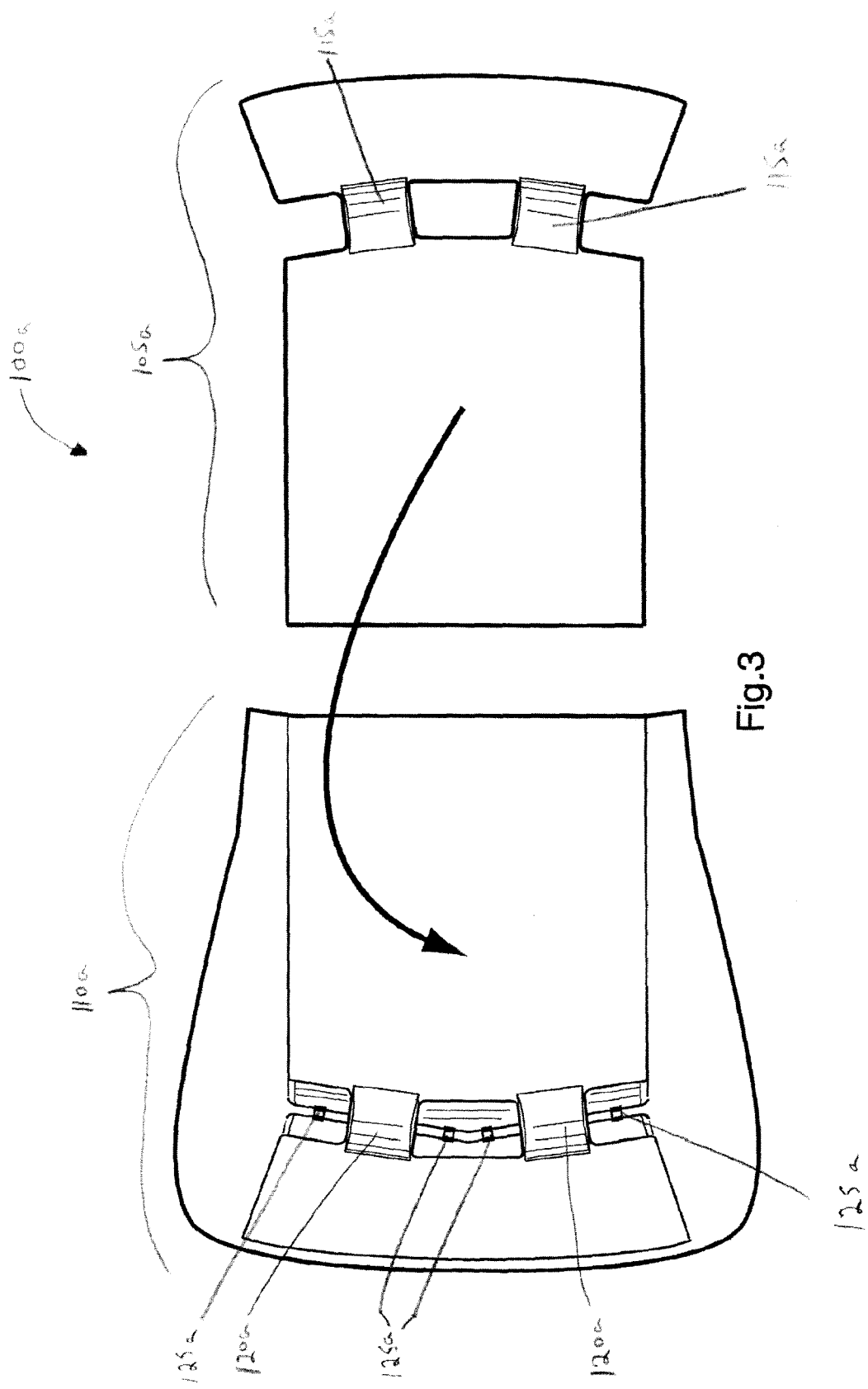
FIG. 3 illustrates a top view of an alternate embodiment of the pated element illustrated in FIGS. 1 and 2.

In one of its aspects, the present invention relates to a padded element comprising a molded foam topper portion and a molded foam substrate portion secured with respect to the molded foam topper portion, the molded foam topper portion and the molded foam substrate portion having a different indentation force deflection at 25% thickness when measured pursuant to ASTM 3574-$B_1$. Preferred embodiments of the padded element may include any one or a combination of any two or more of any of the following features:

the molded foam substrate portion has a greater indentation force deflection than the molded foam topper portion;

one or both of the molded foam topper portion and the molded foam topper portion comprises an isocyanate-based polymer foam;

one or both of the molded foam topper portion and the molded foam substrate portion comprises a polyurethane foam;

one or both of the molded foam topper portion and the molded foam substrate portion comprises a polyolefin-based foam;

one or both of the molded foam topper portion and the molded foam substrate portion comprises a polypropylene foam;

one or both of the molded foam topper portion and the molded foam substrate portion comprises a polyethylene foam;

one or both of the molded foam topper portion and the molded foam substrate portion comprises comprises a uniform density;

one or both of the molded foam topper portion and the molded foam substrate portion comprises a variable density;

the molded foam topper portion and the molded foam substrate portion are attached to one another;

the molded foam topper portion and the molded foam substrate portion are attached to one another by a connecting portion;

the connecting portion comprises a foam portion;

the connecting portion comprises a non-foam portion;

the connecting portion is disposed at adjacent edge portions of the molded foam topper portion and the molded foam substrate portion;

the connecting portion is configured to permit the molded foam topper portion and the molded foam substrate portion to pivot with respect to one another;

the connecting portion comprises a foam element;

the connecting portion comprises a foam element formed in situ during manufacture of the padded element;

the connecting portion comprises a non-foam element the non-foam element comprises a member selected from the group comprising cloth, plastic, fiberglass, scrim and any combination thereof;

the molded foam topper portion and the molded foam substrate portion are secured to one another via an interference fit;

the interference fit comprises a male-female coupling comprising a male half and a female half;

the molded foam topper portion comprises the male half and the molded foam substrate portion comprises a female half;

the molded foam substrate portion comprises a trim cover connection portion configured to secure a trim cover to the padded element;

the trim cover connection portion comprises at least one clip portion configured to receive a rail portion comprised in the trim cover;

the trim cover connection portion comprises a plurality of clip portions configured to receive a rail portion comprised in the trim cover;

the trim cover connection portion is molded in the molded foam substrate portion;

the molded foam topper portion comprises the female half and the molded foam substrate portion comprises a male half;

the interference fit comprises a plurality of male-female couplings, each male-female coupling comprising a male half and a female half;

the molded foam topper portion comprises the male half of each male-female coupling;

the molded foam substrate portion comprises a female half of each male-female coupling;

the molded foam topper portion comprises the male half of each male-female coupling and the molded foam substrate portion comprises a female half of each male-female coupling;

the molded foam substrate portion comprises a trim cover connection portion configured to secure a trim cover to the padded element;

the trim cover connection portion comprises at least one clip portion configured to receive a rail portion comprised in the trim cover;

the trim cover connection portion comprises a plurality of clip portions configured to receive a rail portion comprised in the trim cover;

the trim cover connection portion is molded in the molded foam substrate portion;

the molded foam topper portion comprises the male half from a proportion of each male-female coupling;

the molded foam substrate portion comprises a female half from a proportion of each male-female coupling;

the female half is molded in the molded foam substrate portion;

the female half is integrally molded in the molded foam substrate portion;

the male half is molded in the molded foam topper portion;

the male half is integrally molded in the molded foam topper portion;

the molded foam topper portion comprises the female half and the molded foam substrate portion comprises a male half;

the male half is molded in the molded foam substrate portion;

the male half is integrally molded in the molded foam substrate portion;

the female half is molded in the molded foam topper portion;

the female half is integrally molded in the molded foam topper portion;

the female half and the male half have a substantially complementary shape;

the female half and the male half have a substantially complementary size; and/or the female half and the male half have a substantially complementary shape and size.

In one of its aspects, the present invention relates to a padded element comprising a molded foam topper portion and a molded foam substrate portion secured with respect to the molded foam topper portion via an interference fit. Preferred embodiments of the padded element may include any one or a combination of any two or more of any of the following features:

the interference fit comprises a male-female coupling comprising a male half and a female half;

the molded foam topper portion comprises the male half and the molded foam substrate portion comprises a female half;

the female half comprises a trim cover connection portion configured to secure a trim cover to the padded element the trim cover connection portion comprises at least one clip portion configured to receive a rail portion comprised in the trim cover;

the trim cover connection portion comprises a plurality of clip portions configured to receive a rail portion comprised in the trim cover;

the trim cover connection portion is molded in the molded foam substrate portion;

the molded foam topper portion comprises the female half and the molded foam substrate portion comprises a male half;

the interference fit comprises a plurality of male-female couplings, each male-female coupling comprising a male half and a female half;

the molded foam topper portion comprises the male half of each male-female coupling;

the molded foam substrate portion comprises a female half of each male-female coupling;

the molded foam topper portion comprises the male half of each male-female coupling and the molded foam substrate portion comprises a female half of each male-female coupling;

the female half comprises a trim cover connection portion configured to secure a trim cover to the padded element;

the trim cover connection portion comprises at least one clip portion configured to receive a rail portion comprised in the trim cover;

the trim cover connection portion comprises a plurality of clip portions configured to receive a rail portion comprised in the trim cover;

the trim cover connection portion is molded in the molded foam substrate portion;

the molded foam topper portion comprises the male half from a proportion of each male-female coupling;

the molded foam substrate portion comprises a female half from a proportion of each male-female coupling;

the female half is molded in the molded foam substrate portion;

the female half is integrally molded in the molded foam substrate portion;

the male half is molded in the molded foam topper portion;

the male half is integrally molded in the molded foam topper portion;

the molded foam topper portion comprises the female half and the molded foam substrate portion comprises a male half;

the male half is molded in the molded foam substrate portion;

the male half is integrally molded in the molded foam substrate portion;

the female half is molded in the molded foam topper portion;

the female half is integrally molded in the molded foam topper portion;

the female half and the male half have a substantially complementary shape;

the female half and the male half have a substantially complementary size; and/or the female half and the male half have a substantially complementary shape and size.

Preferred embodiments of the either of general embodiment of the above-mentioned padded elements may include any one or a combination of any two or more of any of the following features:

the molded foam topper portion comprises a first internal surface and the molded foam substrate portion comprises a second internal surface opposed to the first internal surface, at least one of the first internal surface and the second internal surface comprising a textured portion;

the first internal surface comprises a textured portion and the second internal surface is substantially untextured;

the first internal surface is substantially untextured and the second internal surface comprises a textured portion;

both of the first internal surface and the second internal surface comprise a textured portion;

the first internal surface and the second internal surface are in a spaced relationship at a resting position of the padded element;

the first internal surface and the second internal surface are in a contacting relationship at a resting position of the padded element;

the foam substrate is molded;

the foam substrate is molded from a unitary foam portion;

the textured portion comprises a plurality of peak portions and a plurality of valley portions;

each peak portion comprises an apex portion;

the apex portion comprises a first pointed portion;
the apex portion comprises a first rounded portion;
the apex portion comprises a first flat portion;
each valley portion comprises a nadir portion;
the nadir portion comprises a second pointed portion;
the nadir portion comprises a second rounded portion;
the nadir portion comprises a second flat portion;
each peak portion comprises an apex portion and each valley portion comprises a nadir portion;
the apex portion and the nadir portion comprise the same profile;
the apex portion and the nadir portion comprise a different profile;
the apex portion comprises a first pointed portion;
the apex portion comprises a first rounded portion;
the apex portion comprises a first flat portion;
the nadir portion comprises a second pointed portion;
the nadir portion comprises a second rounded portion;
the nadir portion comprises a second flat portion;
each peak portion in the plurality of peak portions is substantially elongate;
the plurality of peak portions are disposed substantially parallel to one another;
each valley portion in the plurality of valley portions is substantially elongate;
the plurality of peak portions comprises a first series of elongate peak portions and a second series of elongate peak portions, the first series and the second series being disposed transverse to one another;
the plurality of peak portions comprises a first series of elongate peak portions and a second series of elongate peak portions, the first series and the second series being disposed non-parallel to one another;
the plurality of peak portions comprises a first series of elongate peak portions and a second series of elongate peak portions, the first series and the second series being disposed orthogonal to one another;
the plurality of valley portions comprises a first series of elongate valley portions and a second series of elongate valley portions, the first series and the second series being disposed transverse to one another;
the plurality of valley portions comprises a first series of elongate valley portions and a second series of elongate valley portions, the first series and the second series being disposed non-parallel to one another;
the plurality of valley portions comprises a first series of elongate valley portions and a second series of elongate valley portions, the first series and the second series being disposed orthogonal to one another;
each peak portion in the plurality of peak portions is substantially elongate and each valley portion in the plurality of valley portions is substantially elongate;
the plurality of peak portions and the plurality of valley portions are disposed in a substantially parallel relationship;
the plurality of peak portions is comprised in a plurality of substantially upstanding projections;
a cross-section of each projection comprises a rectangle;
a cross-section of each projection comprises a trapazoid;
a cross-section of each projection comprises a bi-laterally symmetrical trapazoid;
a cross-section of each projection comprises an ogival shape;
a cross-section of adjacent projections comprises a scallop shape;
a cross-section of valley portions between adjacent projections comprises a scallop shape;

each projection comprises a cloister vault shape;
the plurality of projections comprise substantially the same shape;
the plurality of projections comprise substantially the same dimension;
the plurality of projections comprise substantially the same shape and the same dimension;
the plurality of projections comprise different shapes;
the plurality of projections comprise different dimensions;
the plurality of projections comprise different shapes and different dimensions;
the plurality of projections comprise substantially the same shape and different dimensions;
the plurality of projections comprise different shapes and the same dimension;
at least two valley portions are interconnected to one another;
the plurality of valley portions are interconnected to one another;
at least two valley portions are independent of one another;
the plurality of valley portions are independent of one another;
at least two peak portions are interconnected to one another;
the plurality of peak portions are interconnected to one another;
at least two peak portions are independent of one another;
the plurality of peak portions are independent of one another;
the textured portion comprises a first crenellated pattern;
the textured portion comprises a first crenellated pattern and a second crenellated pattern disposed in a transverse relationship with respect to one another;
the textured portion comprises a first crenellated pattern and a second crenellated pattern disposed in an orthogonal relationship with respect to one another;
the textured portion comprises a first dentellated pattern;
the textured portion comprises a first dentellated pattern and a second dentellated pattern disposed in a transverse relationship with respect to one another;
the textured portion comprises a first dentellated pattern and a second dentellated pattern disposed in an orthogonal relationship with respect to one another;
the seating surface element comprises a plurality of sections, each section comprising a plurality of peak portions and a plurality of valley portions;
the plurality of peak portions in each section are the same;
the plurality of valley portions in each section are the same;
the plurality of peak portions and the plurality of valley portions in each section are the same;
the plurality of peak portions in each section are different;
the plurality of valley portions in each section are different;
the plurality of peak portions and the plurality of valley portions in each section are different; and/or
the padded element further comprises at least one groove that separates at least a portion of a pair of adjacent sections of the plurality of sections;

Accordingly, a highly preferred aspect of the present invention relates to a seat element. Preferably, a seat element is comprised in a vehicular or passenger seat. As used throughout this specification, the term "seat" is intended to have its conventional meaning and includes one or both of a bottom or cushion (i.e., the portion of the seat on which the occupant sits) and a back or backrest (i.e., the portion of the seat which supports the back of the occupant). As is known in the automotive, airline and related industries, a "seat" includes both a cushion (or bottom) and a back (or backrest). Thus, the term "seat" includes a seat element such as a cushion (or bottom), a back (or backrest) or a unit construction comprising a cushion (or bottom) and a back (or backrest). It should also be mentioned that a seat element may be considered to be a cushion (or bottom), a back (or backrest), a headrest and/or an armrest.

While highly preferred embodiments of the present invention will be illustrated with reference to a vehicular seat element, in particular a seat cushion (or bottom), it will be appreciated that the present seat element can be used in non-vehicular applications such as domestic and office furniture, stadium seating, theatre seating and the like.

With reference to FIGS. 1 and 2, there is illustrated a seat element 100. Seat element 100 comprises a molded foam topper portion 105 and a molded foam substrate portion 110.

As described above, molded foam topper portion 105 and molded foam substrate portion 110 have different firmnesses as measured pursuant to ASTM 3574-$B_1$. In a highly preferred embodiment, molded foam topper portion 105 is softer than molded foam substrate portion 110—i.e., the former has an indentation force deflection at 25% that is less than the indention force deflection of the latter when measured pursuant to ASTM 3574-$B_1$.

Molded foam topper portion 105 comprises a pair of male portions 115 and molded foam substrate portion 110 comprises a pair of receptacle portions 120.

Molded foam substrate portion 110 comprises a series of molded-in clip portions 125 which are configured to receive a rail portion of a trim cover (not shown for clarity) for seat element 100.

Molded foam topper portion 105 and molded foam substrate portion 110 are preferably formed from polyurethane foam. Typically, different foamable compositions will be used to arrive at polyurethane foams have different firmnesses. This is within the purview of a person skill in the art having in hand the present specification.

FIG. 3 illustrates an alternate embodiment of seat element 100 illustrated in FIGS. 1 and 2—the suffix "a" has been used with reference numbers in FIG. 3 to denote like elements in the embodiment illustrated in FIGS. 1 and 2.

In FIG. 3, molded foam topper portion 105a is not connected directly to molded foam substrate portion 110a. In this embodiment, molded foam topper portion 105a and molded foam substrate portion 110a would be independently produced. Once so produced, the padded seat element may be folded over as will be described below with reference to seat element 100 illustrated in FIGS. 1 and 2.

Figure 4:
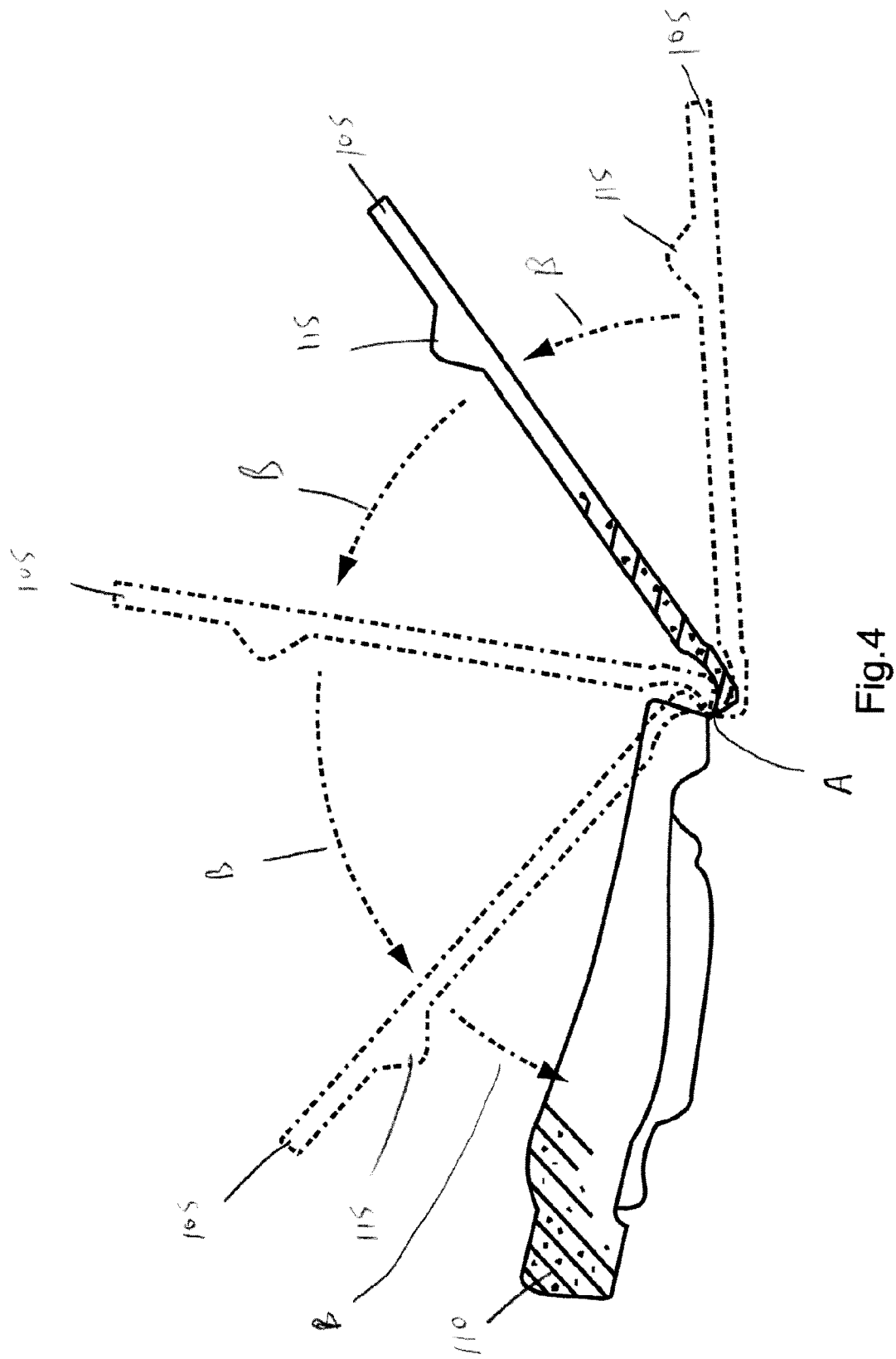
FIG. 4 illustrates the "fold over" assembly of the pated element illustrated in FIGS. 1 and 2.

With reference to FIG. 4, the final assembly of seat element 100 illustrated in FIGS. 1 and 2 is shown.

Thus, it can be seen that molded foam topper portion 105 and molded foam substrate portion 110 can be pivoted about point A in the direction of arrow B—this is a so-called fold over construction scheme. Thus, molded foam topper pad is swung over to meet molded foam substrate portion 110. During this action, male portion 115 of molded foam topper portion 105 engages with receptacle portion 120 in molded foam substrate portion 110 to create an interference fit (preferably friction fit) between male portion 115 and receptacle portion 120. The creation of such an interference fit keeps seat element 100 relatively intact during application of the trim cover. This simplifies manufacture of the finished covered product thereby reducing labor costs and the like.

With reference to FIGS. 7 and 8, further detail on the final assembly of seat element 100 is provided.

In FIG. 7, molded foam topper portion 105 is disposed above molded foam substrate portion 110. The upper surface of molded foam substrate portion 120 comprises a textured surface 130. Preferred embodiments of textured surface 130 may be found above and, for example, in San Miguel referred to above and in International Publication No. WO 2013/006959 [Rossi et al. (Rossi)].

With reference to FIG. 8, as molded topper portion 105 engages molded substrate portion 110, male portions 115 engage with respective receptacle portions 120 in a manner whereby clip portions 125 remain exposed. This facilitates lowering of rail portions 135 of a trim cover (not shown for clarity) in the direction of arrow C to complete the covered seat element.

With reference to FIGS. 5 and 6, there is shown a schematic of a mold 200 that may be used to produce seat element 100.

Mold 200 comprises a lid 205 and a bowl 210. When lid 205 and bowl 210 are fully engaged, a mold sub-cavity 215 is defined corresponding to the shape of molded foam topper portion 105 and a sub-cavity 220 is formed corresponding to the shape of molded foam substrate portion 110. An interface D is provided between mold cavities 215,220 in which foam from both cavities can fuse, co-mingle or otherwise contact to provide a pivot point.

Different foam formulations are disposed in each of sub-cavities 215,220 to achieve difference hardness or firmness as described above. Once the foams in sub-cavities expand, a connecting portion 107 exists between molded foam topper portion 105 and molded foam substrate portion 110. Thus, connecting portion 107 is, in essence, a blend or hybrid of the foam formulations used to produce molded foam topper portion 105 and molded foam substrate portion 110.

With reference to FIGS. 9-11, an alternate embodiment is shown.

In this embodiment, rather than relying only on contact of the foam formulations to produce connecting portion 107, it is possible to add a separate connecting portion 107a or a series of connecting portions 107b. Connecting portions 107a/107b may be made of plastic, cloth or any suitable material. The provision of connecting portions 107a/107b strengthens the connection between molded foam topper portion 105 and molded foam substrate portion 110.

While this invention has been described with reference to illustrative embodiments and examples, the description is not intended to be construed in a limiting sense. Thus, various modifications of the illustrative embodiments, as well as other embodiments of the invention, will be apparent to persons skilled in the art upon reference to this description. It is therefore contemplated that the appended claims will cover any such modifications or embodiments. Further, all of the claims are hereby incorporated by reference into the description of the preferred embodiments.

All publications, patents and patent applications referred to herein are incorporated by reference in their entirety to the same extent as if each individual publication, patent or patent application was specifically and individually indicated to be incorporated by reference in its entirety.

What is claimed is:

1. A padded element comprising a molded foam topper portion and a molded foam substrate portion, wherein the molded foam topper portion and the molded foam substrate portion are molded as a unitary piece and are attached to one another by a connecting portion, the molded foam topper portion and the molded foam substrate portion having a different indentation force deflection at 25% thickness when measured pursuant to ASTM 3574 Test B1.

2. The padded element defined in claim 1, wherein the molded foam substrate portion has a greater indentation force deflection than the molded foam topper portion.

3. The padded element defined in claim 1, wherein the connecting portion is flexible, thereby permitting the molded foam topper portion and the molded foam substrate portion to pivot with respect to one another.

4. The padded element defined in claim 1, wherein the connecting portion comprises a foam element formed in situ during manufacture of the padded element.

5. The padded element defined in claim 1, wherein the connecting portion comprises a non-foam element.

6. The padded element defined in claim 1, wherein the molded foam topper portion and the molded foam substrate portion are configured to fold via the connecting portion and to secure to one another via an interference fit when folded, wherein the interference fit comprises a friction fit or interaction between the molded foam topper portion and the molded foam substrate portion.

7. The padded element defined in claim 6, wherein the interference fit comprises a plurality of male-female couplings, each of said plurality of male-female couplings comprising a male half and a female half.

8. The padded element defined in claim 7, wherein the molded foam substrate portion comprises a trim cover connection portion configured to secure a trim cover to the padded element.

9. The padded element defined in claim 8, wherein the trim cover connection portion comprises a plurality of clip portions configured to receive a rail portion comprised in the trim cover.

10. The padded element defined in claim 8, wherein the trim cover connection portion is molded in the molded foam substrate portion.

11. A padded element comprising a molded foam topper portion and a molded foam substrate portion, wherein the molded foam topper portion and the molded foam substrate portion are molded as a unitary piece, the molded foam substrate portion being configured to fold relative to the molded foam topper portion and to secure to the molded foam topper portion via an interference fit when folded, wherein the interference fit comprises a friction fit or interaction between the molded foam topper portion and the molded foam substrate portion.

12. The padded element defined in claim 11, wherein the interference fit comprises a plurality of male-female couplings, each of said plurality of male-female couplings comprising a male half and a female half.

13. The padded element defined in claim 1, wherein the molded foam topper portion comprises a first internal surface and the molded foam substrate portion comprises a second internal surface opposed to the first internal surface, at least one of the first internal surface and the second internal surface comprising a textured portion.

14. The padded element defined in claim 13, wherein the first internal surface comprises a textured portion and the second internal surface is substantially untextured.

15. The padded element defined in claim 13, wherein the first internal surface is substantially untextured and the second internal surface comprises a textured portion.

16. The padded element defined in claim 13, wherein both of the first internal surface and the second internal surface comprise a textured portion.

17. A seat element comprising the padded element defined in claim 1.

18. The seat element defined in claim 17, comprising a pair of opposed side bolster portions comprising the molded foam substrate portion and a central portion interposed between the pair of opposed side bolster portions, the central portion comprising the molded foam topper portion.

19. The seat element defined in claim 18, further comprising a front bolster portion positioned between the pair of opposed side bolster portions, the front bolster portion comprising the molded foam substrate portion.

20. A vehicular seat comprising the seat element defined in claim 17.

* * * * *